United States Patent
Summers

[11] 3,856,682
[45] Dec. 24, 1974

[54] TWO SHELL GRAVITY OIL-WATER SEPARATOR

[75] Inventor: Robert L. Summers, Roanoke, Va.

[73] Assignee: William D. Mason, Jr., Roanoke, Va. ; a part interest

[22] Filed: Mar. 28, 1973

[21] Appl. No.: 345,696

[52] U.S. Cl.............................. 210/294, 210/340
[51] Int. Cl............................................ B01d 21/24
[58] Field of Search .......... 210/294, 252, 256, 538, 210/540, DIG. 21, 85, 86

[56] References Cited
UNITED STATES PATENTS

| | | | |
|---|---|---|---|
| 911,314 | 2/1909 | Maranville | 210/540 |
| 1,129,893 | 3/1915 | Morris | 210/540 X |
| 1,602,709 | 10/1926 | Riley et al. | 210/256 |
| 2,003,140 | 5/1939 | Dehn | 210/538 X |
| 2,846,073 | 8/1958 | Hopper, Sr. | 210/256 |

Primary Examiner—John Adee
Attorney, Agent, or Firm—Clarence A. O'Brien; Harvey B. Jacobson

[57] ABSTRACT

A pair of upstanding generally concentric inner and outer cylindrical tanks are provided. The tanks are closed at their bottoms and the inner and outer tanks are provided with liquid inlet and outlet means, respectively, disposed at substantially the same upper level below the upper ends of the tanks. The outer tank includes lift passage defining structure with an upper outlet end communicated with the outer tank outlet and a lower inner end opening into a lower portion of the outer tank. Further, structure defining a liquid transfer passage including an inlet end opening into a lower portion of the inner tank and an outlet end opening into an upper portion of the outer tank is provided and liquid flow controlling valve structure is operatively associated with the liquid inlet for the inner tank and the transfer passage. Also, the inner tank is provided with a flow controllable gravity liquid outlet at a level below the inner tank inlet and above the inlet of the liquid transfer passage.

7 Claims, 5 Drawing Figures

3,856,682

TWO SHELL GRAVITY OIL-WATER SEPARATOR

The separator of the instant invention has been designed to provide a means whereby different liquids such as oil and water may be separated and the oil may be contained in a reservoir for periodic draining. The separator can be constructed to any desired size and includes an inherent supplemental oil storage compartment should oil collect in the main oil storage compartment at a greater rate than expected between servicing periods for draining the main oil storage reservoir.

The separator may be readily interposed within any generally horizontal liquid line whether the line be disposed above or below ground level. Still further, the separator is constructed so as to be extremely easy to service and drain the accumulated oil therefrom.

The main object of this invention is to provide a water and oil separator which may be utilized in numerous environments for the purpose of separating oil from drainage water.

Another object of this invention, in accordance with the immediately preceding object, is to provide a separator which will be capable of storing the oil separated from the drainage water in a reservoir therefor that may be readily drained after a predetermined minimum amount of oil has been collected.

Another important object of this invention is to provide a separator in accordance with the preceding objects and including provisions for receiving and storing separated oil after the main oil storage compartment of the separator has been filled.

A final object of this invention to be specifically enumerated herein is to provide a separator which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
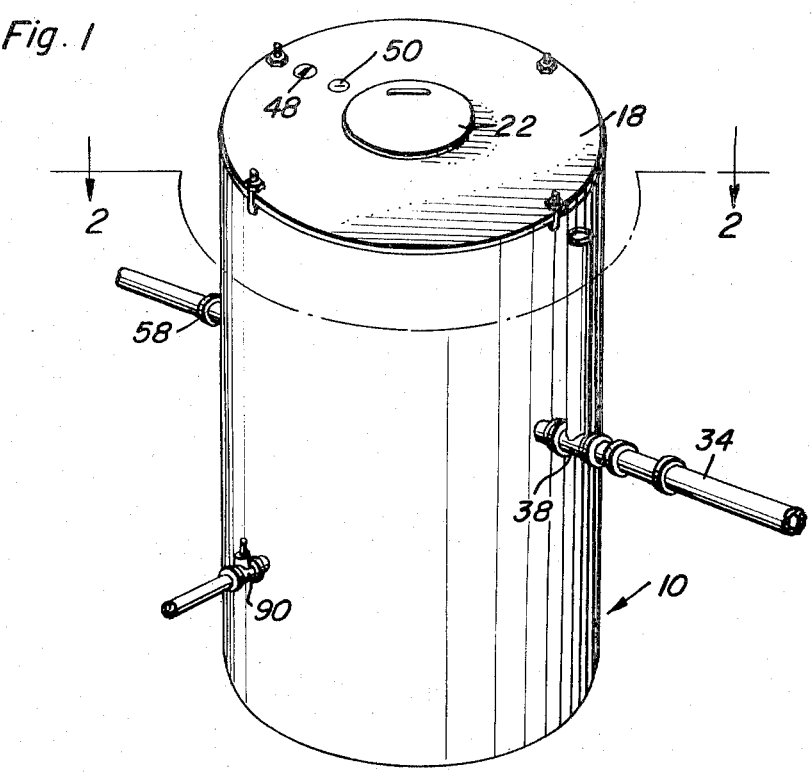
FIG. 1 is a perspective view of the exterior of the separator of the instant invention.
Figure 2:
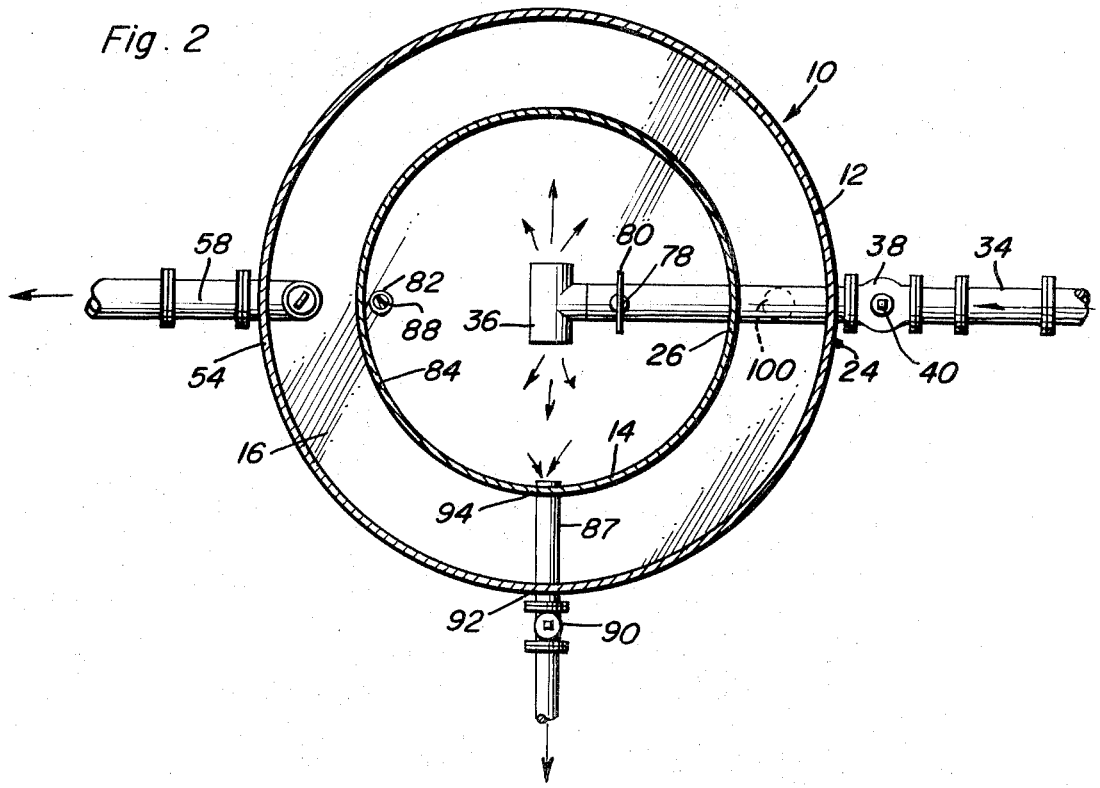
FIG. 2 is an enlarged fragmentary horizontal sectional view taken substantially upon the plane indicated by the section line 2—2 of FIG. 1.
Figure 3:
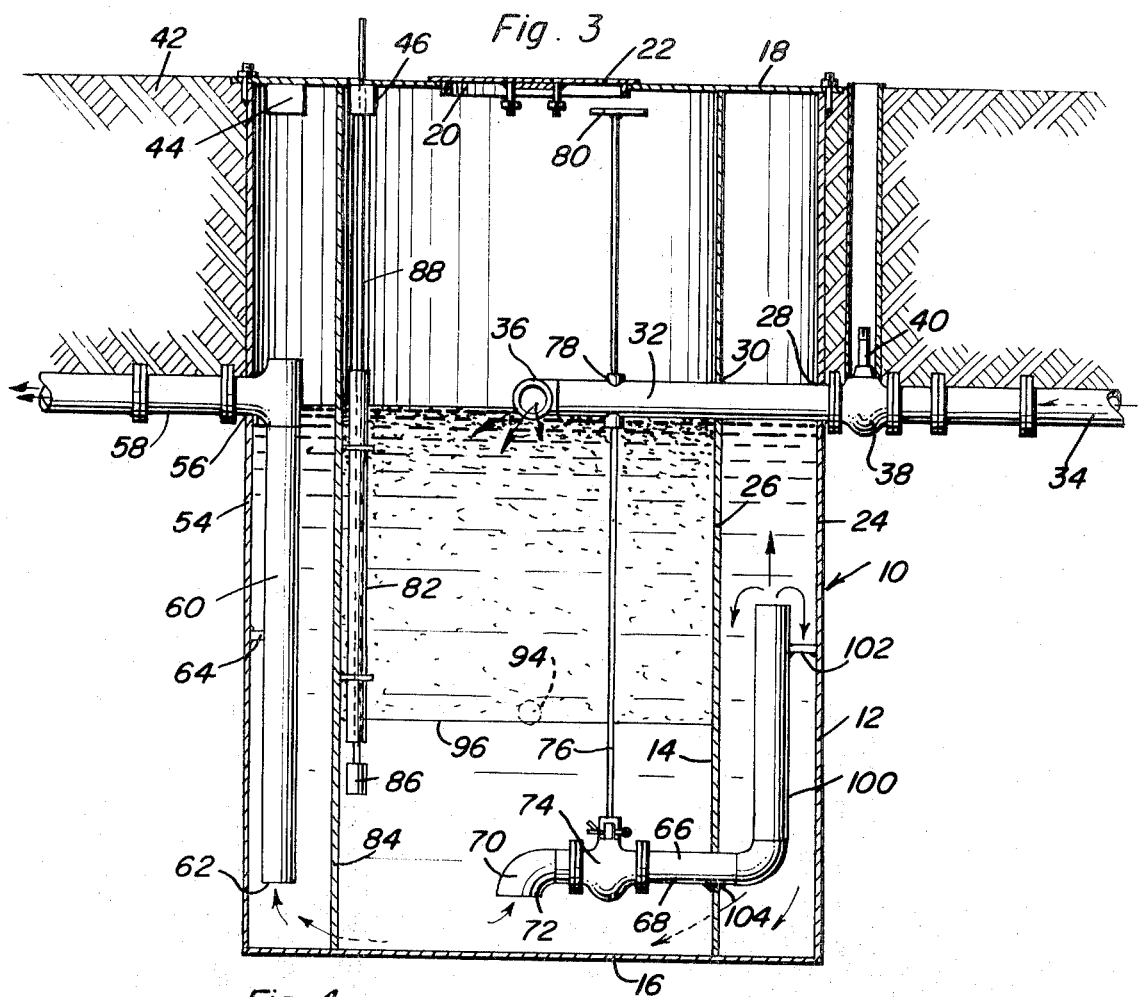
FIG. 3 is an enlarged vertical sectional view of the separator illustrated as serially connected within a drain line disposed below ground level and taken substantially upon a plane passing through the center line of the separator.

Referring now more specifically to the drawings, the numeral 10 generally designates the separator of the instant invention which includes generally concentric outer and inner cylindrical bodies 12 and 14. The bodies 12 and 14 are nested and vertically disposed and are closed at their lower ends by means of a horizontal bottom wall 16 and at their upper ends by means of a horizontal top wall 18 having a central access opening 20 formed therein removably closed by a lid 22, the access opening 20 opening into the interior of the inner body 14.

The bodies 12 and 14 and the bottom wall 16 define a first inner tank component defined by the body 14 and a second outer tank component defined by the body 12.

Corresponding wall portions 24 and 26 of the bodies 12 and 14 have horizontally aligned openings 28 and 30 formed therethrough. The outlet end portion 32 of an inlet pipe 34 is sealingly secured through the openings 28 and 30 and includes a horizontally disposed T-fitting 36 on its terminal end centrally disposed within the inner tank component 26.

The inlet pipe 34 includes a flow controlling valve 38 and the valve 38 includes an upwardly projecting actuator 40 to which access may be gained by a suitable tool (not shown) from above ground, the pipe 34 and separator 10 being embedded in the ground 42. The top wall 18 is flush with the upper surface of the ground 42 and has a first internally threaded coupling 44 secured therethrough flush with the upper surface of the top wall in the area thereof on the outlet side of the separator 10 between the body 12 and the body 14. Further, a second internally threaded coupling 46 of slightly smaller diameter is secured through an adjacent portion of the top wall 18 immediately inwardly of the area bounded by the cylindrical body 14. A threaded plug 48 is threaded in the coupling 44 and a threaded plug 50 is threaded in the coupling 46.

The wall portion 54 of the body 12 remote from the wall portion 24 has an opening 56 formed therein in horizontal registry with the opening 28 and the inlet end of an outlet pipe 58 is sealingly secured through the opening 56. The inlet end of the outlet pipe 58 includes a depending draw tube 60 extending down within the body 12 exteriorly of the body 14 to an entry level 62 spaced slightly above the bottom wall 16. The lower end portion of the draw tube 60 is braced from the interior of the body 12 by means of a brace 64.

A transfer tube or pipe 66 is provided and includes a horizontal inlet end 68 with a downwardly opening inlet fitting 70 on the terminal end thereof centered in the lower portion of the body 14. The inlet fitting 70 opens downwardly at an entrance level 72 which is substantially horizontally aligned with the entrance level 62. The inlet end 68 includes a flow control valve 74 including an upwardly projecting actuator 76 which is journaled through an upstanding guide sleeve 78 secured through the outlet end 32 of the inlet pipe 34. The upper end of the operator 76 includes a T-handle 80 spaced slightly below one peripheral portion of the access opening 20.

A guide tube 82 extends vertically along and is supported from the inner surface of the wall portion 84 remote from the wall portion 26 of the body 14. The guide tube 82 is in vertical registry with the coupling 46 and a sample cup 86 is supported from the lower end of an upstanding rod 88 and is vertically slidable through the guide tube 82 and extractable through the coupling 46 when the plug 50 is removed. The guide tube 82 additionally functions, and perhaps more importantly, as a means to allow sampling of the liquid below the lower end of the guide tube 82 by means of the sample cup 86 without contamination of the sample by liquids disposed within the body 14 intermediate the upper and lower ends of the tube 82. During normal usage of the separator 10 the rod 88 and cup 86 will be removed and the coupling 46 will be closed by the plug 50.

A gravity discharge drainpipe 87 including a flow control valve 90 is sealingly secured through the body 12 as at 92 and through the body 14 as at 94 and opens into the interior of the first tank component at an entrance level 96 spaced above the entrance levels 62 and 72 as well as the lower end of the tube 82. The pipe 87 may have a suitable liquid container registered with the outlet end thereof whenever it is desired to drain liquid from within the inner tank compartment above the level 96.

Figure 4:
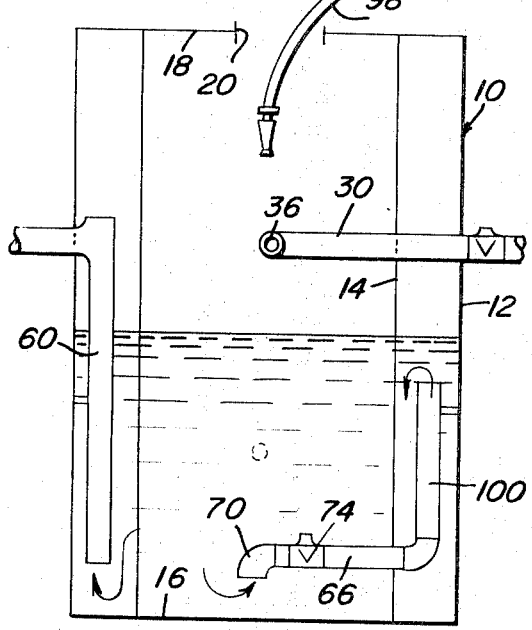
FIG. 4 is a schematic view of the separator illustrating the manner in which the liquid level therein is initially established at the level of the associated drainpipe.
Figure 5:
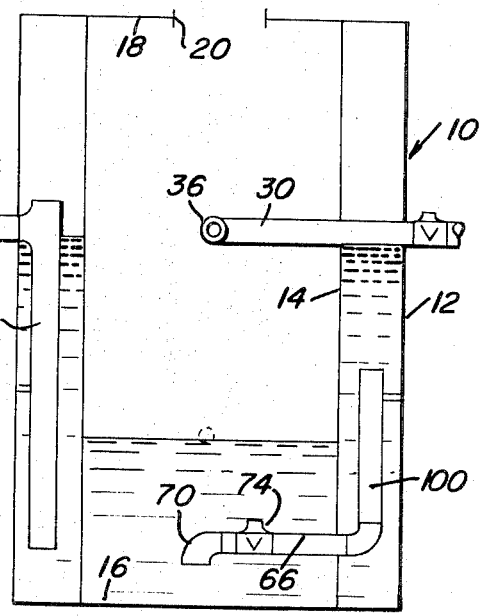
FIG. 5 is a schematic view illustrating the manner in which oil collected within the separator may be gravity drained therefrom.

In operation, after the separator 10 has been recessed within the ground 42 and serially connected in the drainpipe including the inlet pipe 34 and the outlet pipe 58, the lid 22 is removed and the separator 10 is filled with water by means of the hose 98 in the manner illustrated in FIG. 4 of the drawings while the valve 38 is closed. After the level of water within the separator 10 reaches the level of the outlet pipe 58, water from within the separator 10 will begin to flow out of the outlet pipe 58 signalling that the proper level of water has been reached. Thereafter, the ingress of water into the separator 10 may be terminated and the hose 98 withdrawn after which the lid 22 may be replaced. Then, the valve 38 is opened and any mixture of water and oil flowing through the pipe 34 will be discharged into the inner tank component 14 through the fitting 36. The oil discharged into the separator 10 will remain at the surface of the liquid within the separator 10 and the water will flow downwardly to the bottom of the inner tank component, pass upwardly through the fitting 70 and the transfer pipe 66 whose upstanding outlet end 100 projects upwardly into the outer tank component 12 and is braced from an interior wall surface thereof by means of a brace 102, the inlet end 68 of the transfer pipe 66 being sealingly secured through the lower portion of the wall portion 26 as at 104. As the water flows from the inner tank component 14 into the outer tank component 12 an equal quantity of water will flow from the outlet pipe 58.

The continued flow of a mixture of water and oil into the separator 10 will cause the oil in the upper portion of the inner tank component 14 to build up downwardly toward the gravity outlet pipe 87.

At any time it is wished to determine if the quantity of oil within the inner tank component 14 has built-up sufficiently to extend its lower limit down below the guide tube 82, the plug 50 may be removed and the rod 88 and cup 86 may be lowered into the inner tank component 14 and downwardly through the guide tube 82 so as to obtain a sample of the liquid disposed below the lower end of the guide tube 82.

If the sample of liquid obtained includes oil, it is then known that the lower level of oil within the inner tank component 14 is below the lower end of the tube 82. At this point, oil within the inner tank component 14 should be withdrawn therefrom. A suitable receptacle is registered with the outlet end of the pipe 87 and the valves 38 and 74 are closed after which the valve 90 is opened. This will allow the liquid within the inner tank component 14 above the level 96 to be drained through the pipe 87. After all of the oil above the level 96 has been drained, the valve 90 is closed and water is again admitted into the inner tank component 14 by means of the hose 98 until the level of liquid within the inner tank component 14 is elevated to the level of the inlet and outlet pipes 34 and 58. Thereafter, the hose 98 is again removed and the lid 22 is replaced after which the valves 74 and 38 may be opened.

If for any reason maintenance in the form of drainage of oil from within the upper portion of the inner tank component 14 is not carried out when needed and the lower level of oil within the inner tank component 14 drops to the entrance level 72, any additional quantities of oil entering the separator 10 through the pipe 34 will result in an equal quantity of oil passing through the transfer pipe 66 and into the outer tank component 12. However, inasmuch as the outlet from the outer tank component 12 is defined by the lower end of the lift or discharge tube 60 and whatever oil enters the interior of the outer tank component 12 will tend to float to the top of the liquid within the outer tank component 12, the separator 10 will still be operative to separate the oil from the water entering the separator 10. Of course, once oil reaches the interior of the outer tank component 12 and its presence therein is known, it is necessary to clean out the outer tank component 12 before renewed operation of the separator 10 may commence.

The separator 10 is therefore capable of separating oil from water, retaining the separated oil in a storage compartment, establishing means whereby the separated and collected oil may be drained from the separator 10 and also functioning to provide a separate oil collection and storage chamber within the separator and without allowing the flow of oil through the separator in the event proper maintenance of the separator is not maintained and the lower level of oil within the inner tank component 14 is allowed to build downwardly to the entrance level 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gravity separator comprising a tank assembly defining first and second individual tank components, said first component including an upper inlet opening thereinto at a working level spaced below the upper end thereof and including means for the ingress of oil and water into said first component at said level in a generally horizontal direction, said second component including an upper outlet opening opening outwardly therefrom at a level spaced below the upper end thereof and generally horizontally aligned with the inlet, said second component including means defining an upstanding lift passage is closed communication with the outlet opening at its upper end and opening downwardly into a lower interior portion of said second component at its lower end, means defining a transfer passage having inlet and outlet ends communicated with a lower portion of the interior of the first component and an upper portion of the interior of the second component, respectively, a flow control valve operatively associated with said inlet and a flow control valve operatively associated with said transfer passage, and a gravity discharge outlet passage having its inlet end opening into the interior of said first component at a level spaced appreciably below the first mentioned level and at least somewhat above the lower end of said transfer passage, and flow control valve means operatively associated with said gravity discharge outlet passage.

2. The combination of claim 1 wherein said first and second components comprise nested upstanding tubular tank bodies closed at their lower ends.

3. The combination of claim 2 wherein the outer tubular tank body includes a lower bottom wall to which the lower end of the inner tubular tank body is sealingly secured.

4. The combination of claim 1 wherein said first and second components comprise nested upstanding tubular tank bodies closed at their lower ends, said first component comprising the inner tank body and the second component comprising the outer tank body.

5. The combination of claim 1 wherein the upper end of said first component includes an upper access opening having a closure member removably secured thereover.

6. The combination of claim 5 including an upstanding tube member supported within said first component and having its upper end spaced above said inlet and its lower end spaced below the level of the inlet end of said gravity discharge outlet passage, a sample cup lowerable downwardly through said tube member for sampling the liquid within said first component below the level of said gravity discharge outlet passage, the lower end of said tube member terminating downwardly at an elevation spaced above the inlet end of said transfer passage.

7. A gravity separator comprising inner and outer nested tubular bodies, a bottom wall closing the lower ends of said bodies and thereby defining individual inner and outer tank components within the inner tubular body and between the inner tubular body and the outer tubular body, respectively, said inner tank component including a horizontally opening liquid inlet in an upper portion thereof and said outer tank component including a liquid outlet disposed at generally the same level as said liquid inlet, a lift tube disposed in said outer tank component having its upper end in sealed communication with said outlet and its lower end opening into the interior of a lower portion of said outer tank component, means defining a transfer passage having an inlet end opening into a lower portion of said inner tank component and an outlet end opening into an upper portion of said outer tank component below said liquid outlet, a valved gravity discharge outlet passage defining member including an inlet end opening into the interior of said inner tank component at a level spaced below the first mentioned liquid inlet and above the inlet end of said transfer passage, and flow control valve means operatively associated with said transfer passage and flow control valve means operatively associated with said liquid inlet.

* * * * *